(12) United States Patent
Terai et al.

(10) Patent No.: US 10,876,626 B2
(45) Date of Patent: Dec. 29, 2020

(54) TRANSMISSION-EQUIPPED VEHICLE (71) Applicant: KAWASAKI JUKOGYO KABUSHIKI KAISHA, Kobe (JP)

(72) Inventors: Shohei Terai, Kobe (JP); Daisuke Kawai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/517,905

(22) Filed: Jul. 22, 2019

(65) Prior Publication Data
US 2020/0040986 A1 Feb. 6, 2020

(30) Foreign Application Priority Data

Aug. 6, 2018 (JP) ................. 2018-147447

(51) Int. Cl.
*F16H 61/04* (2006.01)
*B60W 30/19* (2012.01)
*F16H 61/02* (2006.01)

(52) U.S. Cl.
CPC ............. *F16H 61/04* (2013.01); *B60W 30/19* (2013.01); *F16H 2061/0244* (2013.01)

(58) Field of Classification Search
CPC . B60W 30/19; F16H 61/04; F16H 2061/0244
See application file for complete search history.

(56) References Cited

U.S. PATENT DOCUMENTS

2002/0000133 A1\* 1/2002 Yamamoto .............. F16H 61/32
74/335

FOREIGN PATENT DOCUMENTS

JP 2012237347 A 12/2012

\* cited by examiner

*Primary Examiner* — Huan Le
(74) *Attorney, Agent, or Firm* — Alleman Hall Creasman & Tuttle LLP (57) ABSTRACT

A controller includes: an automatic shifting control section that carries out automatic shifting control in which a shifting actuator is driven in response to a predetermined automatic shifting command; and an assist control section that, when a predetermined assist condition is met, carries out assist control in which the shifting actuator is driven to assist motion of a manual shifting power transmission mechanism actuated upon operation of a shifting operation member by a driver.

8 Claims, 3 Drawing Sheets

TRANSMISSION-EQUIPPED VEHICLE

CROSS-REFERENCE TO RELATED APPLICATION

This application claims priority to and the benefit of Japanese Patent Application No. 2018-147447, filed on Aug. 6, 2018, the entire disclosure of which is incorporated herein by reference.

BACKGROUND OF THE INVENTION

Field of the Invention

The present invention relates to a vehicle equipped with a transmission that changes rotational speed derived from rotational power output from a prime mover.

Description of the Related Art

Japanese Laid-Open Patent Application Publication No. 2012-237347 discloses a shifting system operable in an automatic shifting mode and in a manual shifting mode. In the automatic shifting mode, a shift control motor is driven to actuate a transmission when a parameter such as the vehicle speed meets a predetermined condition. In the manual shifting mode, the shift control motor is driven to actuate the transmission upon operation of a shift selection switch by the driver.

However, with the configuration disclosed in Japanese Laid-Open Patent Application Publication No. 2012-237347, the shifting power that causes the transmission to perform a shifting process is a drive force generated by the shift control motor, rather than an operation force applied by the driver, even in the manual shifting mode. Thus, the driver receives no reaction force from the transmission during shifting operation in the manual shifting mode and therefore cannot experience the feeling of mechanically shifting the transmission. This diminishes the pleasure of vehicle driving.

If a shifting operation member (e.g., a shifting operation lever) to be operated by the driver is mechanically connected to the transmission, the shifting operation member is mechanically connected also to the shift control motor. This causes a mechanical resistance derived from the motor during operation of the shifting operation member by the driver, thus imposing an operational burden on the driver. Even if a configuration can be made in which no motor-derived mechanical resistance occurs during operation of the shifting operation member by the driver, the driver may wish to more easily perform the manual shifting with a smaller force.

SUMMARY OF THE INVENTION

An object of the present invention is to make it possible, in a vehicle having both a manual shifting function and an automatic shifting function, to improve the operation feeling experienced by the driver during manual shifting and at the same time enable the driver to easily operate a shifting operation member with a small force.

A transmission-equipped vehicle according to an aspect of the present invention is a vehicle including a transmission that changes rotational speed derived from rotational power output from a prime mover, and the vehicle includes: a shifting operation member operated by a driver; a manual shifting power transmission mechanism that transmits, to the transmission, an operation force applied to the shifting operation member by the driver, the operation force acting as shifting power for a shifting process; a shifting actuator; an automatic shifting power transmission mechanism that transmits a drive force of the shifting actuator to the manual shifting power transmission mechanism, the drive force acting as the shifting power; and a controller that controls the shifting actuator, the controller including: an automatic shifting control section that carries out automatic shifting control in which the shifting actuator is driven in response to a predetermined automatic shifting command; and an assist control section that, when a predetermined assist condition is met, carries out assist control in which the shifting actuator is driven to assist motion of the manual shifting power transmission mechanism actuated upon operation of the shifting operation member by the driver.

With the above configuration, the operation force applied to the shifting operation member by the driver is transmitted as shifting power for a shifting process to the transmission via the manual shifting power transmission mechanism. Thus, the driver can receive a reaction force from the transmission and experience improved operation feeling during manual shifting. Additionally, when operation of the shifting operation member by the driver is detected, the motion of the manual shifting power transmission mechanism is assisted by the shifting actuator. This allows the driver to easily operate the shifting operation member with a small force and increases the reliability of the shifting process. Thus, in the vehicle having both a manual shifting function and an automatic shifting function, it is possible to improve the operation feeling experienced by the driver during manual shifting and at the same time enable the driver to easily operate a shifting operation member with a small force.

The vehicle may further include a manual operation detector and have a configuration in which: the controller further includes a learning section that learns an operation pattern of the shifting operation member when the assist condition is not met, the operation pattern being detected by the manual operation detector; and the automatic shifting control section defines a drive pattern of the shifting actuator based on a result of learning by the learning section.

With the above configuration, when automatic shifting is carried out by the automatic shifting control section, the drive pattern of the shifting actuator is defined based on the contents of the learning of the operation pattern according to which the shifting operation lever is operated by the driver. Thus, automatic shifting can be achieved which reflects the habit of the driver. The operation pattern may be the trend of the movement of the shifting operation member (e.g., the trend of the operation force, the operation speed, or the operation acceleration) or may be the trend of the vehicle state during operation of the shifting operation member (e.g., the trend of the engine rotational speed or the vehicle speed during shifting operation by the driver).

The vehicle may further include a driving operation detector that detects which operation state a driving operation member is in, the driving operation member including an acceleration operation member, a brake operation member, or a clutch operation member, and the vehicle may have a configuration in which: the controller further includes a shifting intension determination section that determines whether the driver has an intention to perform shifting based on a detection result of the driving operation detector; and the shifting intension determination section outputs the automatic shifting command upon determination that the driver has an intention to perform shifting.

With the above configuration, automatic shifting takes place on the presumption of the intention of the driver to perform shifting even when the driver does not operate any portion such as an input button specialized for automatic shifting. This can reduce the operational burden imposed on the driver.

The vehicle may have a configuration in which: the transmission has a first gear position, a second gear position, and a neutral position located between the first gear position and the second gear position; the controller further includes a gear position determination section that determines which gear position the transmission is in and a traveling/stopping determination section that determines whether the vehicle is traveling or stopped; and when the vehicle is determined to be traveling, at least one of the automatic shifting control section and the assist control section controls the shifting actuator in such a way that the neutral position is skipped during shifting up from the first gear position and during shifting down from the second gear position.

With the above configuration, improper shifting can be prevented both when the vehicle is traveling and when the vehicle is stopped. The traveling/stopping determination section may make the determination based on the vehicle speed or the state of a side stand or a clutch.

The vehicle may have a configuration in which: a main clutch is provided between the primer mover and the transmission; the controller further includes a clutch state determination section that determines which state the main clutch is in and a traveling/stopping determination section that determines whether the vehicle is traveling or stopped; and when the vehicle is determined to be traveling and the main clutch is determined to be in an engaged state, at least one of the automatic shifting control section and the assist control section controls the shifting actuator so as to prohibit shifting from the neutral position.

With the above configuration, improper shifting can be prevented both when the vehicle is traveling and when the vehicle is stopped. The traveling/stopping determination section may make the determination based on the vehicle speed or the state of a side stand or the clutch.

The vehicle may further include an operation input device operated by the driver to input the automatic shifting command to the controller and may have a configuration in which: the transmission is a dog clutch transmission; the controller further includes a prime mover control section that controls the primer mover; when the automatic shifting command input through the operation input device is detected during acceleration of the primer mover, the primer mover control section corrects a command value for the primer mover to deceleration side; and when the automatic shifting command input through the operation input device is detected during deceleration of the primer mover, the primer mover control section corrects the command value for the primer mover to acceleration side.

With the above configuration, in automatic shifting performed in response to input operation on the operation input device, the correction of the command value for the primer mover is initiated at the instant when the input operation on the operation input device has been detected, rather than at the instant when start of the motion of the shifting power transmission mechanism has been detected. Thus, the correction of the command value for the primer mover can be initiated early, and smooth shifting can be achieved.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

Figure 1:
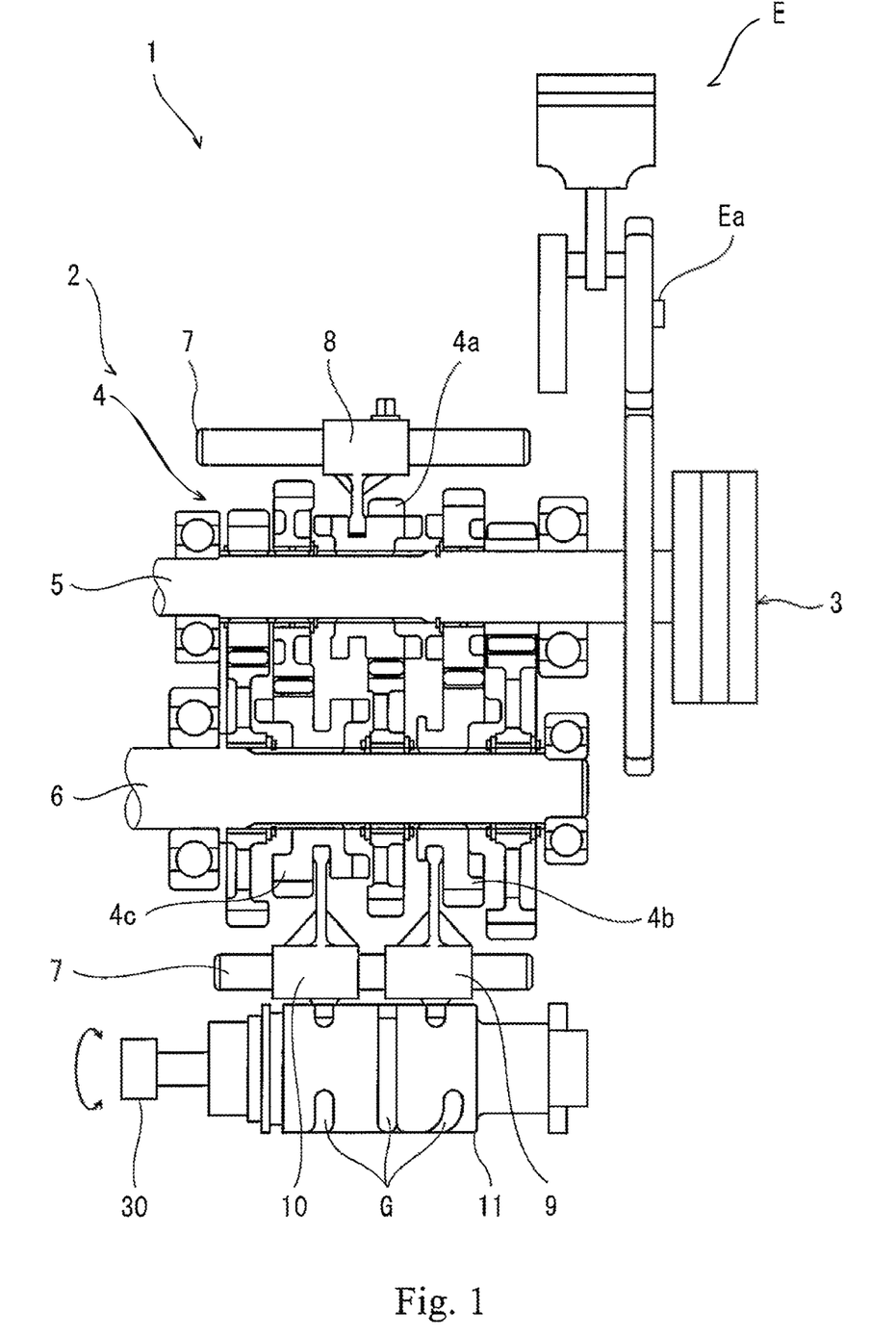
FIG. 1 is a schematic diagram of a transmission-equipped vehicle according to an embodiment.

FIG. 1 is a schematic diagram of a transmission-equipped vehicle 1 according to an embodiment. As shown in FIG. 1, the vehicle 1 includes a prime mover E (e.g., an internal combustion engine or an electric motor), a transmission 2 that changes rotational speed derived from rotational power generated by the prime mover E, and a main clutch 3 (e.g., a multi-plate clutch) provided between the prime mover E and the transmission 2. The vehicle 1 may be any vehicle that changes rotational speed derived from rotational power of the prime mover E by the transmission 2 and that uses the resulting power as power for travel of the vehicle. The vehicle 1 is, for example, a motorcycle. The transmission 2 is a transmission configured to transmit power from an input shaft 5 to an output shaft 6 via a plurality of gear trains 4 having different reduction gear ratios and perform the shifting process by selection of any one of the gear trains 4. For example, the transmission 2 is a dog clutch transmission. The transmission 2 has a first gear position, a second gear position, and a neutral position located between the first gear position and the second gear position.

To the input shaft 5 of the transmission 2 is transmitted the rotational power from a crank shaft Ea of the prime mover E. To the output shaft 6 is connected a power output mechanism (e.g., a chain or a belt) that transmits power to a drive wheel (not shown). In the transmission 2, shift forks 8 to 10 are slidably supported by support shafts 7 disposed parallel to the input shaft 5 and the output shaft 6. One end of the shift fork 8 is connected to a dog gear 4a of the input shaft 5, and respective one ends of the other shift forks 9 and 10 are connected to dog gears 4b and 4c of the output shaft 6.

The other ends of the shift forks 8 to 10 are fitted in guide grooves G of a shift drum 11. When the shift drum 11 rotates upon transmission of operation power to one end of the shift drum 11, the shift forks 8 to 10 guided by the guide grooves G cause the corresponding dog gears 4a to 4c to slide along the output shaft 6 so that one of the gear trains 4 that has a desired reduction gear ratio enters a power transmission state. In this manner, a power transmission path with a desired shift position is selected.

Figure 2:
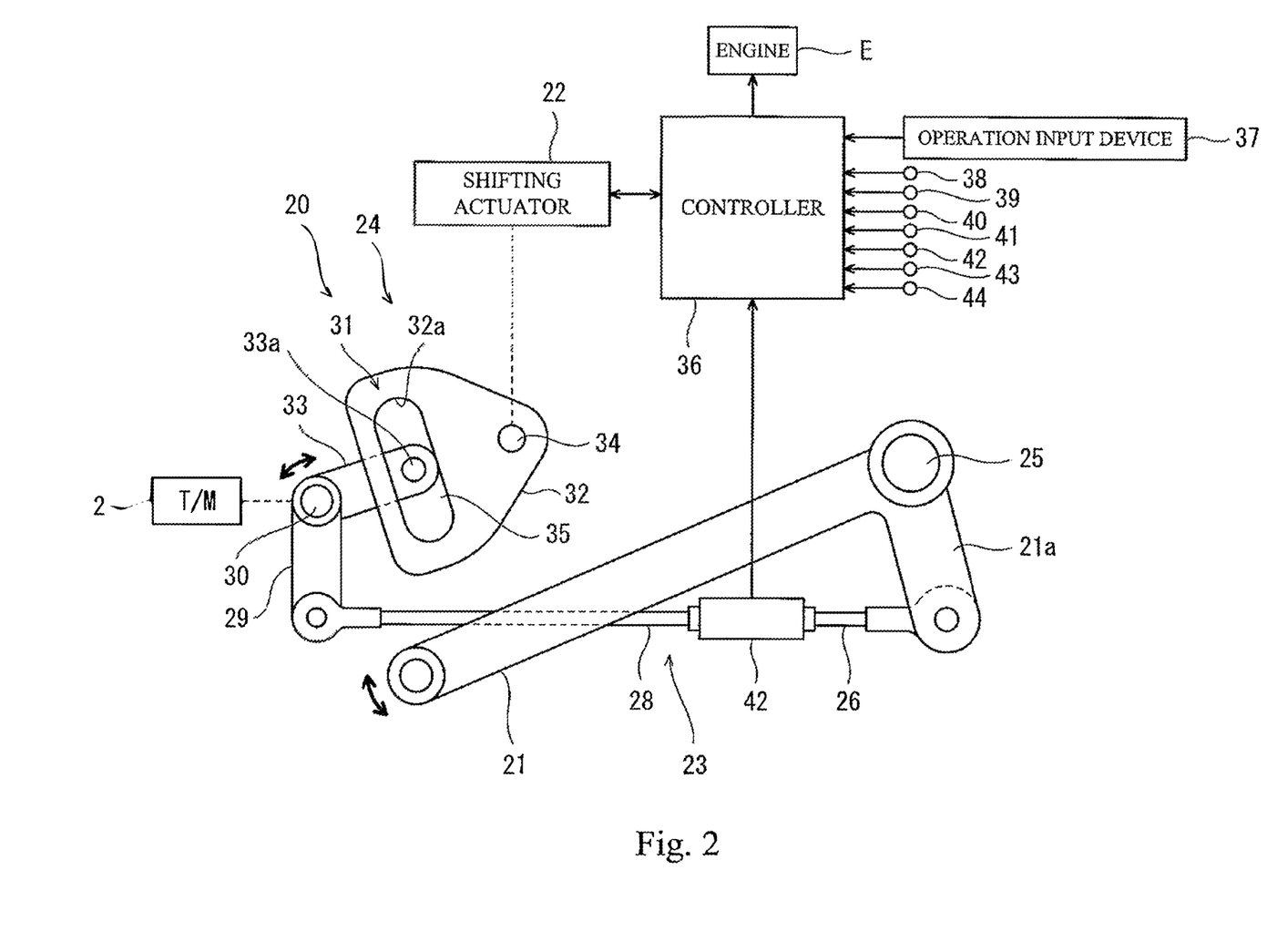
FIG. 2 is a schematic diagram of shifting power transmission mechanisms of a shifting system of the vehicle shown in FIG. 1.

FIG. 2 is a schematic diagram of shifting power transmission mechanisms of a shifting system 20 of the vehicle 1 shown in FIG. 1. In the shifting system 20, as shown in FIG. 2, the transmission 2 is rotatable by an operation force applied to a shifting operation lever 21 (shifting operation member) by the driver and is rotatable also by a drive force of a shifting actuator 22 (e.g., an electric motor). That is, the operation force applied to the shifting operation lever 21 by the driver and the drive force of the shifting actuator 22 can be used as shifting power for actuating the transmission 2. Specifically, the shifting operation lever 21 operated by the driver can rotate the shift drum 11 (see FIG. 1), and the shifting actuator 22 can also rotate the shift drum 11.

The shifting system 20 includes: a manual shifting power transmission mechanism 23 that transmits, to the shift drum 11 (see FIG. 1) of the transmission 2, an operation force applied to the shifting operation lever 21 by the driver; and an automatic shifting power transmission mechanism 24 that transmits a drive force of the shifting actuator 22 to the manual shifting power transmission mechanism 23. The manual shifting power transmission mechanism 23 mechanically connects the shifting operation lever 21 to one end of the shift drum 11. The shifting operation lever 21 is swung by the driver (e.g., by a foot of the driver) about a swingably supporting shaft 25 serving as a swinging axis. The manual shifting power transmission mechanism 23 includes a first rod 26, a load sensor 42 (manual shifting operation detector), a second rod 28, a swinging arm 29, and a rotating member 30.

One end of the first rod 26 is connected to a swinging portion 21a provided integrally with the shifting operation lever 21. Upon operation of the shifting operation lever 21, the swinging portion 21a swings about the swingably supporting shaft 25. The second rod 28 is disposed in alignment with the first rod 26, and the other end of the first rod 26 is connected to one end of the second rod 28 via the load sensor 42. The other end of the second rod 28 is coupled to one end of the swinging arm 29. The other end of the swinging arm 29 is secured to the rotating member 30. The rotating member 30 is mounted to one end of the shift drum 11 (see FIG. 1) so as to rotate together with the shift drum 11.

When the shifting operation lever 21 is operated in one direction, the rotating member 30 is rotated in the one direction via the first rod 26, load sensor 42, second rod 28, and swinging arm 29, and the shift drum 11 rotates to the shift-up side. When the shifting operation lever 21 is operated in the opposite direction, the rotating member 30 is rotated in the opposite direction, and the shift drum 11 rotates to the shift-down side. When the shifting operation lever 21 is operated, the operation is detected by the load sensor 42. Although the load sensor 42 is described as an example of the manual shifting operation detector, the manual shifting operation detector may be another type of sensor. For example, the manual shifting operation detector may be a displacement sensor that detects angular displacement of the shifting operation lever 21 or shift drum 11 or may be a motion sensor or a camera that detects the motion of the driver (a foot of the driver).

The automatic shifting power transmission mechanism 24 is a mechanism that transmits a drive force of the shifting actuator 22 to the rotating member 30 to rotate the rotating member 30. In the present embodiment, the automatic shifting power transmission mechanism 24 includes a relief portion 31 provided between the shifting actuator 22 and the rotating member 30. The automatic shifting power transmission mechanism 24 may be configured without the relief portion 31. The relief portion 31 is capable of transmitting a rotational drive force of the shifting actuator 22 to the rotating member 30, and prevents transmission to the shifting actuator 22 of the motion of the manual shifting power transmission mechanism 23 actuated upon operation of the shifting operation lever 21.

Specifically, the relief portion 31 includes an engaged member 32 and an engaging member 33. The engaged member 32 has an engaged portion 32a and moves in conjunction with the shifting actuator 22. For example, the engaged member 32 is a plate member rotated by a rotating shaft 34 driven by the shifting actuator 22, and the engaged portion 32a is an longitudinal engaged hole formed in the engaged member 32. The engaging member 33 has an engaging portion 33a engaging with the engaged portion 32a, and moves in conjunction with the motion of the manual shifting power transmission mechanism 23 (in particular the rotating member 30). For example, the engaging member 33 is an arm-like member projecting from the rotating member 30, and the engaging portion 33a is an engaging pin provided at the tip of the engaging member 33 and inserted in the engaged hole provided as the engaged portion 32a.

The relief portion 31 has a clearance portion 35 provided between the engaged portion 32a and the engaging portion 33a in the direction of the motion of the engaging member 33 which occurs in conjunction with the motion of the manual shifting power transmission mechanism 23. The clearance portion 35 is formed over the entire region in which the engaging portion 33a can be displaced in conjunction with the motion of the manual shifting power transmission mechanism 23. Thus, when the transmission 2 is manually shifted by operation of the shifting operation lever 21, the engaging portion 33a is displaced (undergoes lost motion) within the clearance portion 35 and does not interfere with the engaged member 32 even though the engaging member 33 pivots in conjunction with the rotation of the rotating member 30. That is, transmission of power from the manual shifting power transmission mechanism 23 is interrupted by the clearance portion 35, and transmission of the power to the shifting actuator 22 via the engaged member 32 is prevented. Thus, mechanical resistance caused by the shifting actuator 22 does not act on the driver during operation of the shifting operation lever 21.

The shifting system 20 includes a controller 36, an operation input device 37, and various detectors 38 to 44. The controller 36 controls the shifting actuator 22 and the prime mover E based on signals from the operation input device 37 and the detectors 38 to 44. When the transmission 2 is automatically shifted by a drive force of the shifting actuator 22, rotation of the rotating shaft 34 caused by the shifting actuator 22 leads to the engaged member 32 being swung until the engaged portion 32a comes into contact with the engaging portion 33a, and the engaged member 32 is further swung by the shifting actuator 22, so that the engaging portion 33a is pushed by the engaged portion 32a. This causes rotation of the rotating member 30 and hence rotation of the shift drum 11, thus accomplishing the automatic shifting. After completion of the shifting process induced by the shifting actuator 22, the shifting actuator 22 is controlled to return the engaging portion 33a to the center of the hole of the engaged member 32 in the direction of the motion of the engaging portion 33a.

An operation force applied to the shifting operation lever 21 by the driver is transmitted as shifting power for a shifting process to the shift drum 11 of the transmission 2 via the manual shifting power transmission mechanism 23. Thus, the driver can receive a reaction force from the transmission 2 and experience improved operation feeling during manual shifting. Therefore, in the vehicle 1 having both a manual shifting function and an automatic shifting function, the driver can have a desired operation sensation during manual shifting and experience good operation feeling.

Figure 3:
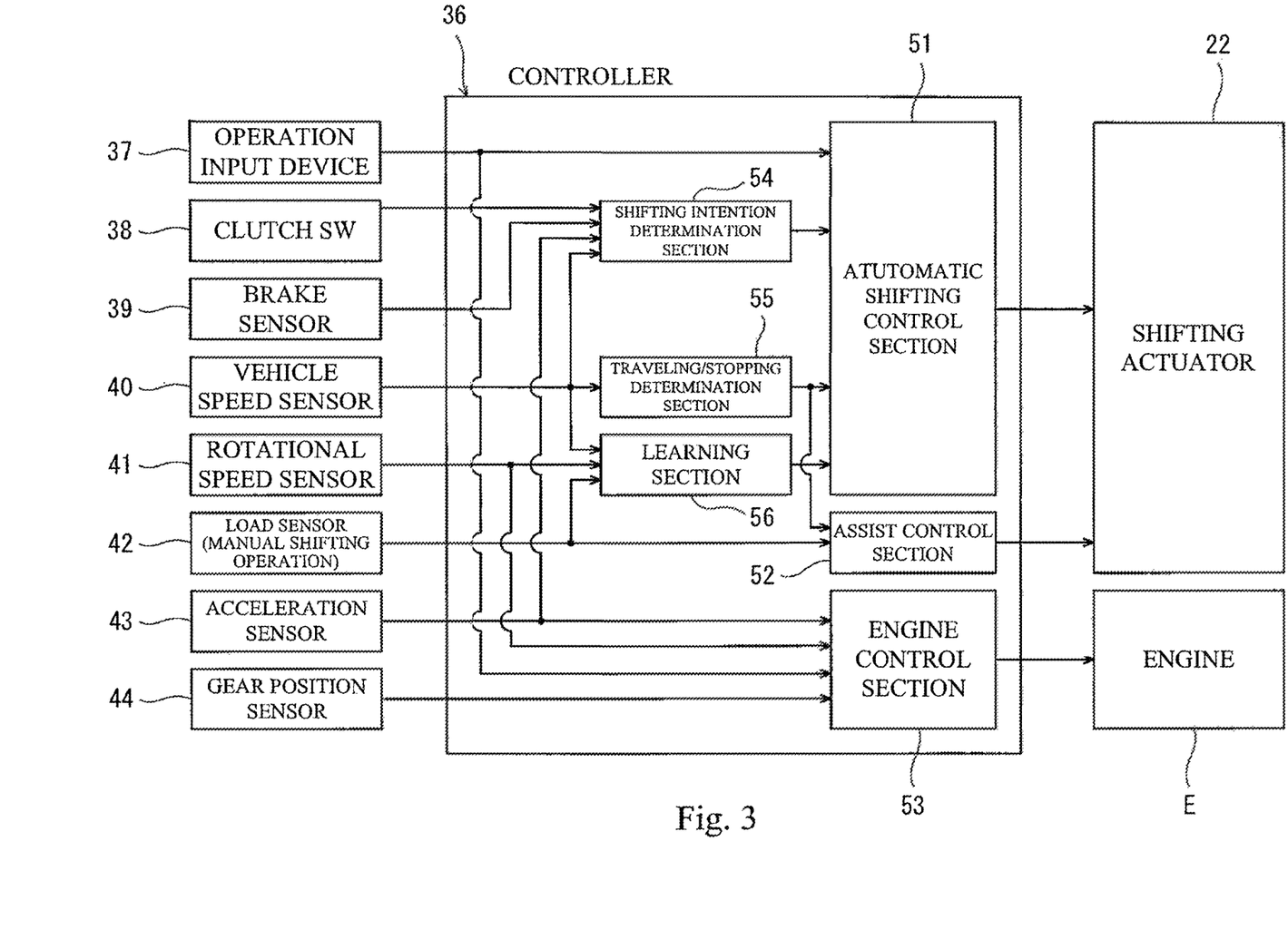
FIG. 3 is a control block diagram of the shifting system shown in FIG. 2.

FIG. 3 is a control block diagram of the shifting system 20 shown in FIG. 2. As shown in FIG. 3, the operation input device 37, a clutch switch 38 (clutch state detector or driving operation detector), a brake sensor 39 (driving operation detector), a vehicle speed sensor 40, a rotational speed sensor 41, a load sensor 42 (manual shifting operation detector), an acceleration sensor 43 (driving operation detector), and a gear position sensor 44 (shifting process detector) are connected to the input of the controller 36.

The operation input device 37 is operated by the driver (e.g., by a hand of the driver) and is, for example, a touch panel display, an input button, or an input lever. The clutch switch 38 detects the state (engaged state or disengaged state) of the main clutch 3. Instead of detecting the state (engaged state or disengaged state) of the main clutch 3, the clutch switch 38 may detect, for example, the operation state (clutch-engaged state or clutch-disengaged state) of a non-illustrated clutch operation member (driving operation member) such as a clutch lever which is operated by the driver. A sensor may be used instead of the switch as the clutch state detector.

The brake sensor 39 detects the operation state (braking state or non-braking state) of a non-illustrated brake operation member (driving operation member) for braking of the vehicle 1. The brake sensor 39 may be, for example, a position sensor that detects the position of the non-illustrated brake operation member (driving operation member) such as a brake lever or a pressure sensor that detects the brake pressure. The vehicle speed sensor 40 detects the traveling speed of the vehicle 1. For example, the vehicle speed sensor 40 detects the rotational speed of the non-driven wheel. The rotational speed sensor 41 detects the rotational speed of the prime mover E.

The load sensor 42 detects a load imposed on the manual shifting power transmission mechanism 23 to detect whether the shifting operation lever 21 is operated by the driver. The acceleration sensor 43 detects the degree of operation of a non-illustrated acceleration operation member (driving operation member) such as an accelerator grip. When the prime mover E is an internal combustion engine, a throttle opening degree sensor that detects the opening degree of a throttle valve acting in conjunction with the acceleration operation member may be used instead of the acceleration sensor 43. The gear position sensor 44 detects the shift position by determining which of the gear trains 4 of the transmission 2 has been selected as a gear train entering the power transmission state. The gear position sensor 44 may detect the shift position of the transmission 2 continuously or stepwise.

The controller 36 includes hardware components including a processor, a volatile memory, a non-volatile memory, and an I/O interface. The controller 36 includes software components including an automatic shifting control section 51, an assist control section 52, a prime mover control section 53, a shifting intension determination section 54, a traveling/stopping determination section 55, and a learning section 56. That is, the sections 51 to 56 of the controller 36 are implemented through processing that the processor performs using the volatile memory according to programs stored in the non-volatile memory.

The automatic shifting control section 51 carries out automatic shifting control in which the automatic shifting control section 51 drives the shifting actuator 22 in response to a predetermined automatic shifting command to rotate the shift drum 11. The automatic shifting command can be input to the automatic shifting control section 51 from various sources. For example, the automatic shifting command is input to the automatic shifting control section 51 when an input operation for giving an instruction to carry out automatic shifting is performed by the driver on the operation input device 37. The automatic shifting command is input to the automatic shifting control section 51 from the shifting intension determination section 54, which is described later, when the shifting intension determination section 54 determines that the driver has the intention to perform shifting.

When the automatic shifting control section 51 carries out the automatic shifting control, the controller 36 may instruct an output device (e.g., a display device, a sound generation device, or a vibrator) to perform an output action (e.g., displaying, sound output, or vibration generation) that allows the driver to know that the automatic shifting control is being carried out.

The automatic shifting control section 51 may prohibit the automatic shifting control when the vehicle is determined to be in a specific state. In an example where the vehicle 1 is a leaning vehicle (e.g., a motorcycle) whose vehicle body is leaned during cornering, the automatic shifting control may be prohibited when the vehicle is determined to be in a state where the leaning angle is more than a predetermined value (banked state). The automatic shifting control section 51 may prohibit the automatic shifting control when the vehicle 1 is determined to be in a wheelie state or a slip state.

When a predetermined assist condition is met, the assist control section 52 carries out assist control in which the shifting actuator 22 is driven in response to a detection signal of the load sensor 42 to assist the motion of the manual shifting power transmission mechanism 23 actuated upon operation of the shifting operation lever 21 by the driver. That is, the assist control section 52 adds shifting power produced by the shifting actuator 22 to the shifting power produced by the driver, so as to reduce the force required for the driver to operate the shifting operation lever 21. The assist control section 52 terminates the assist control when the manual shifting is determined to be completed based on a detection signal of the load sensor 42 or gear position sensor 44.

The assist condition is met when the driver is detected to have started operation of the shifting operation lever 21. In the present embodiment, the assist condition is met when the load detected by the load sensor 42 exceeds a predetermined threshold. The assist condition may be met when the difference in rotational speed between the engaging side and engaged side of the dog clutch of the transmission 2 is determined to be more than a predetermined value based on the rotational speed of the prime mover E and the rotational speed of the drive wheel. In this case, shifting shock or shifting failure can be prevented by virtue of the assist force of the shifting actuator 22 even if the large difference in rotational speed causes a large resistance to the dog clutch changing from a non-engaged state to an engaged state.

When the assist control section 52 carries out the assist control, the controller 36 may instruct an output device (e.g., a display device, a sound generation device, or a vibrator) to perform an output action (e.g., displaying, sound output, or vibration generation) that allows the driver to know that the assist control is being carried out.

The controller 36 may be configured to operate in an assist control-enabled mode in which the assist control by the assist control section 52 is enabled or in an assist control-disabled mode in which the assist control by the assist control section 52 is disabled, and may be configured to switch between these modes in response to selection by the driver. In this case, the assist condition is met when the load detected by the load sensor 42 exceeds a predetermined threshold with the assist control-enabled mode being selected. When the assist control-disabled mode has been selected, the assist condition is not met even if the load detected by the load sensor 42 exceeds the predetermined threshold.

When operation of the shifting operation lever 21 by the driver is detected by the load sensor 42, the motion of the manual shifting power transmission mechanism 23 is assisted by the shifting actuator 22. This allows the driver to easily operate the shifting operation lever 21 with a small force and increases the reliability of the shifting process. Thus, in the vehicle 1 having both a manual shifting function and an automatic shifting function, it is possible to improve the operation feeling experienced by the driver during manual shifting and at the same time enable the driver to easily operate the shifting operation lever 21 with a small force.

The primer mover control section 53 controls the prime mover E based on detection signals of the acceleration sensor 43, rotational speed sensor 41, and gear position sensor 44 and a signal input from the operation input device 37. When the automatic shifting command input through the operation input device 37 is detected in a situation where the prime mover E is determined to be accelerating based on a detection signal of the rotational speed sensor 41, the primer mover control section 53 corrects a command value for the prime mover E so as to decelerate the primer mover (for example, when the primer mover is an internal combustion engine, the ignition is temporarily stopped or the throttle opening degree is temporarily reduced). When the automatic shifting command input through the operation input device 37 is detected in a situation where the prime mover E is determined to be decelerating based on a detection signal of the rotational speed sensor 41, the primer mover control section 53 corrects the command value for the prime mover E so as to accelerate the primer mover (for example, when the primer mover is an internal combustion engine, the throttle opening degree is temporarily increased).

As a result of this control, the load imposed on the engaged dog gear among the dog gears 4a to 4c (see FIG. 1) of the transmission 2 in the rotational direction is temporarily removed during a shifting process. Thus, the dog clutch can be actuated without interruption of power transmission between the prime mover E and the transmission 2, and this allows the driver to perform easy and quick shifting operation without having to operate the main clutch 3. Additionally, in automatic shifting, the correction of the command value for the prime mover E is initiated at the instant when input operation on the operation input device 37 has been detected, rather than at the instant when start of the motion of the automatic shifting power transmission mechanism 24 has been detected. Thus, the correction of the command value for the prime mover E can be initiated early, and smooth shifting can be achieved.

The shifting intension determination section 54 serves to allow the automatic shifting control section 51 to carry out automatic shifting on the presumption of the intention of the driver to perform shifting when the driver does not operate the operation input device 37. The shifting intension determination section 54 determines whether the driver has the intention to perform shifting based on detection results obtained by the clutch switch 38 and at least one of the brake sensor 39 and the acceleration sensor 43. Upon determination that the driver has the intention to perform shifting, the shifting intention determination section 54 outputs an automatic shifting command to the automatic shifting control section 51.

For example, when the clutch switch 38 detects that the main clutch 3 is disengaged and the acceleration sensor 43 detects that the acceleration operation member is in a non-operated position (fully-closed position), the shifting intension determination section 54 determines that the driver has the intention to perform shifting. The shifting intension determination section 54 may determine that the driver has the intention to perform shifting when the acceleration sensor 43 detects blipping operation in which the degree of operation of the acceleration operation member alternately increases and decreases. The shifting intension determination section 54 may determine that the driver has the intention to perform shifting only based on the detection of disengagement of the main clutch 3 by the clutch switch 38.

Further, when the shifting intension determination section 54 determines that the driver has the intention to perform shifting, the shifting intension determination section 54 determines the direction of shifting (shift up or shift down) based on a detection signal of the vehicle speed sensor 40. For example, when the vehicle is determined from a change in vehicle speed to be accelerating, the shifting intension determination section 54 determines that the driver has the intention to perform shifting up, while when the vehicle is determined from a change in vehicle speed to be decelerating, the shifting intension determination section 54 determines that the driver has the intention to perform shifting down. Whether the vehicle 1 is accelerating or decelerating may be determined based on a detection signal of an acceleration sensor (e.g., a gyro sensor) rather than on a detection signal of the vehicle speed sensor 40.

The shifting intension determination section 54 may be configured to determine the direction of shifting (shift up or shift down) based on a detection signal of the brake sensor 39 when the shifting intension determination section 54 determines that the driver has the intention to perform shifting. Specifically, the shifting intension determination section 54 may determine that the driver has the intention to perform shifting down when brake operation is detected at the same time as the driver is determined to have the intention to perform shifting.

The traveling/stopping determination section 55 determines whether the vehicle 1 is traveling or stopped based on a detection signal of the vehicle speed sensor 40. When the traveling/stopping determination section 55 determines that the vehicle 1 is traveling, the automatic shifting control section 51 and the assist control section 52 control the shifting actuator 22 with reference to a detection signal of the gear position sensor 44 in such a way that in the transmission 2, the neutral position is skipped during shifting up from the first gear position and during shifting down from the second gear position.

In the case where the prime mover E is an internal combustion engine, the automatic shifting control section 51 and the assist control section 52 control the shifting actuator 22 so as to prohibit shifting from the neutral position when the traveling/stopping determination section 55 determines that the vehicle 1 is stopped and the clutch switch 38 detects that the main clutch 3 is in an engaged state. That is, the prime mover E is prevented from stalling due to establishment of the power transmission path between the prime mover E and the drive wheel when the vehicle is stopped. Thus, improper shifting can be prevented both when the vehicle is traveling and when the vehicle is stopped. The traveling/stopping determination section 55 may make the determination based on the vehicle speed. The traveling/stopping determination section 55 may determine that the vehicle is stopped when a side stand is in use and determine that the vehicle is traveling when the side stand is not in use.

The learning section 56 learns an operation pattern of the shifting operation lever 21 when the assist condition is not met, the operation pattern being detected by at least the load sensor 42. Namely, the learning section 56 learns the trend of the movement of the shifting operation lever 21 (e.g., the trend of the operation force, the operation speed, or the operation acceleration). The automatic shifting control section 51 defines a drive pattern of the shifting actuator 22 based on the result of learning by the learning section 56. With this feature, when automatic shifting is carried out by the automatic shifting control section 51, the drive pattern of the shifting actuator 22 is defined based on the contents of the learning of the operation pattern according to which the shifting operation lever 21 is operated by the driver during manual shifting. Thus, automatic shifting can be achieved which reflects the habit of the driver in manual shifting.

The learning section 56 may learn, as the operation pattern, the trend of the vehicle state during manual operation of the shifting operation lever 21. For example, the learning section 56 may learn the trend of the vehicle speed during manual shifting operation by the driver based on the detection signal of the vehicle speed sensor 40 during manual shifting, in order to determine when automatic shifting should be carried out by the automatic shifting control section 51. The learning section 56 may learn the trend of the rotational speed of the prime mover E during manual shifting operation by the driver based on the detection signal of the rotational speed sensor 41 during manual shifting, in order to determine when automatic shifting should be carried out by the automatic shifting control section 51.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A transmission-equipped vehicle comprising a transmission that changes rotational speed derived from rotational power output from a prime mover, the vehicle comprising:
    a shifting operation member operated by a driver;
    a manual linkage that transmits, to the transmission, an operation force applied to the shifting operation member by the driver, the operation force acting as shifting power for a shifting process;
    a shifting actuator;
    an automatic linkage that transmits a drive force of the shifting actuator to the manual linkage, the drive force acting as the shifting power; and
    a controller that controls the shifting actuator, the controller comprising:
        an automatic shifting control section that carries out automatic shifting control in which the shifting actuator is driven in response to a predetermined automatic shifting command regardless of operation of the shifting operation member that transmits the shifting power to the manual linkage; and
        an assist control section that, when a predetermined assist condition is met, carries out assist control in which the shifting actuator is driven to assist motion of the manual linkage actuated upon operation of the shifting operation member by the driver.

2. The transmission-equipped vehicle according to claim 1, further comprising an operation input device operated by the driver to input the automatic shifting command to the controller, wherein
    the transmission is a dog clutch transmission,
    the controller further comprises a prime mover control section that controls the prime mover,
    when the automatic shifting command input through the operation input device is detected during acceleration of the prime mover, the prime mover control section corrects a command value for the prime mover to a deceleration side, and
    when the automatic shifting command input through the operation input device is detected during deceleration of the prime mover, the prime mover control section corrects the command value for the prime mover to an acceleration side.

3. The transmission-equipped vehicle according to claim 1, wherein the manual linkage includes:
    at least one rod coupled to the shifting operation member;
    a swinging arm rotatable coupled at a first end thereof to one rod of the at least one rod; and
    a rotating member coupled to a second end of the swinging arm and to the transmission.

4. The transmission-equipped vehicle according to claim 1, wherein the automatic linkage includes:
    an engaged member having a rotating shaft driven by the shifting actuator to thereby rotate the engaged member; and
    an engaging member that engages with the engaged member and moves in conjunction with motion of the manual linkage.

5. A transmission-equipped vehicle comprising a transmission that changes rotational speed derived from rotational power output from a prime mover, the vehicle comprising:
    a shifting operation member operated by a driver;
    a manual linkage that transmits, to the transmission, an operation force applied to the shifting operation member by the driver, the operation force acting as shifting power for a shifting process;
    a shifting actuator;
    an automatic linkage that transmits a drive force of the shifting actuator to the manual linkage, the drive force acting as the shifting power;
    a controller that controls the shifting actuator; and
    a manual operation detector, wherein
    the controller comprises:
        an automatic shifting control section that carries out automatic shifting control in which the shifting actuator is driven in response to a predetermined automatic shifting command;
        an assist control section that, when a predetermined assist condition is met, carries out assist control in which the shifting actuator is driven to assist motion of the manual linkage actuated upon operation of the shifting operation member by the driver; and
        a learning section that learns an operation pattern of the shifting operation member when the assist condition is not met, the operation pattern being detected by the manual operation detector, and
    the automatic shifting control section defines a drive pattern of the shifting actuator based on a result of learning by the learning section.

6. A transmission-equipped vehicle comprising a transmission that changes rotational speed derived from rotational power output from a prime mover, the vehicle comprising:
    a shifting operation member operated by a driver;
    a manual linkage that transmits, to the transmission, an operation force applied to the shifting operation member by the driver, the operation force acting as shifting power for a shifting process;
a shifting actuator;
an automatic linkage that transmits a drive force of the shifting actuator to the manual linkage, the drive force acting as the shifting power;
a controller that controls the shifting actuator; and
a driving operation detector that detects which operation state a driving operation member is in, the driving operation member including an acceleration operation member, a brake operation member, or a clutch operation member, wherein
the controller comprises:
an automatic shifting control section that carries out automatic shifting control in which the shifting actuator is driven in response to a predetermined automatic shifting command;
an assist control section that, when a predetermined assist condition is met, carries out assist control in which the shifting actuator is driven to assist motion of the manual linkage actuated upon operation of the shifting operation member by the driver; and
a shifting intention determination section that determines whether the driver has an intention to perform shifting based on a detection result of the driving operation detector, and
the shifting intention determination section outputs the automatic shifting command upon determination that the driver has an intention to perform shifting.

7. A transmission-equipped vehicle comprising a transmission that changes rotational speed derived from rotational power output from a prime mover, the vehicle comprising:
a shifting operation member operated by a driver;
a manual linkage that transmits, to the transmission, an operation force applied to the shifting operation member by the driver, the operation force acting as shifting power for a shifting process;
a shifting actuator;
an automatic linkage that transmits a drive force of the shifting actuator to the manual linkage, the drive force acting as the shifting power;
a controller that controls the shifting actuator, wherein
the transmission has a first gear position, a second gear position, and a neutral position located between the first gear position and the second gear position,
the controller comprises:
an automatic shifting control section that carries out automatic shifting control in which the shifting actuator is driven in response to a predetermined automatic shifting command;
an assist control section that, when a predetermined assist condition is met, carries out assist control in which the shifting actuator is driven to assist motion of the manual linkage actuated upon operation of the shifting operation member by the driver; and
a traveling/stopping determination section that determines whether the vehicle is traveling or stopped, and
when the vehicle is determined to be traveling, at least one of the automatic shifting control section and the assist control section controls the shifting actuator in such a way that the neutral position is skipped during shifting up from the first gear position and during shifting down from the second gear position.

8. A transmission-equipped vehicle comprising a transmission that changes rotational speed derived from rotational power output from a prime mover, the vehicle comprising:
a shifting operation member operated by a driver;
a manual linkage that transmits, to the transmission, an operation force applied to the shifting operation member by the driver, the operation force acting as shifting power for a shifting process;
a shifting actuator;
an automatic linkage that transmits a drive force of the shifting actuator to the manual linkage, the drive force acting as the shifting power;
a controller that controls the shifting actuator; and
a main clutch provided between the prime mover and the transmission, wherein
the controller comprises:
an automatic shifting control section that carries out automatic shifting control in which the shifting actuator is driven in response to a predetermined automatic shifting command;
an assist control section that, when a predetermined assist condition is met, carries out assist control in which the shifting actuator is driven to assist motion of the manual linkage actuated upon operation of the shifting operation member by the driver;
a gear position determination section that determines which gear position the transmission is in;
a clutch state determination section that determines which state the main clutch is in; and
a traveling/stopping determination section that determines whether the vehicle is traveling or stopped, and
when the vehicle is determined to be traveling and the main clutch is determined to be in an engaged state, at least one of the automatic shifting control section and the assist control section controls the shifting actuator so as to prohibit shifting from the neutral position.

* * * * *